(12) United States Patent
Brown et al.

(10) Patent No.: US 7,574,482 B2
(45) Date of Patent: Aug. 11, 2009

(54) INTERNAL MEMORY CONTROLLER PROVIDING CONFIGURABLE ACCESS OF PROCESSOR CLIENTS TO MEMORY INSTANCES

(75) Inventors: David Allen Brown, Austin, TX (US); Amit M. Shah, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1179 days.

(21) Appl. No.: 10/699,092

(22) Filed: Oct. 31, 2003

(65) Prior Publication Data
US 2005/0097184 A1    May 5, 2005

(51) Int. Cl.
G06F 15/16     (2006.01)
G06F 12/02     (2006.01)
G06F 13/00     (2006.01)

(52) U.S. Cl. .......................... 709/217; 709/218; 711/1; 711/152

(58) Field of Classification Search ......... 709/217–219, 709/225; 711/1, 152
See application file for complete search history.

(56) References Cited

U.S. PATENT DOCUMENTS

| | | | | |
|---|---|---|---|---|
| 6,118,711 A | * | 9/2000 | Merritt ........................ | 365/200 |
| 6,128,710 A | * | 10/2000 | Greenspan et al. .......... | 711/152 |
| 6,157,962 A | * | 12/2000 | Hodges et al. .................. | 710/1 |
| 6,477,612 B1 | * | 11/2002 | Wang ............................. | 711/2 |
| 6,665,268 B1 | * | 12/2003 | Sato et al. .................... | 370/242 |
| 6,775,230 B1 | * | 8/2004 | Watanabe et al. ........... | 370/228 |
| 7,275,103 B1 | * | 9/2007 | Thrasher et al. ............. | 709/224 |
| 2002/0103923 A1 | * | 8/2002 | Cherian et al. .............. | 709/235 |
| 2002/0103969 A1 | * | 8/2002 | Koizumi et al. ............. | 711/114 |
| 2002/0124153 A1 | * | 9/2002 | Litaize et al. ................. | 712/11 |
| 2003/0093442 A1 | * | 5/2003 | Mogi et al. .................. | 707/203 |
| 2004/0049564 A1 | * | 3/2004 | Ng et al. ...................... | 709/223 |

* cited by examiner

*Primary Examiner*—Hussein Elchanti
(74) *Attorney, Agent, or Firm*—Ryan, Mason & Lewis, LLP (57) ABSTRACT

An internal memory controller of a network processor or other type of processor controls access of processor clients to memory instances of an internal memory of the processor. The internal memory controller includes a configurable switching element that is connectable between the clients and the memory instances, and is operative to control access of particular ones of the clients to particular ones of the memory instances. Generally, the configurable switching element is configurable to connect any one of at least a subset of the clients to each of at least a subset of the memory instances. In a first selectable configuration of the configurable switching element, a given one of the processor clients is permitted to access a first set of one or more memory instances, and in a second selectable configuration of the configurable switching element, the given processor client is permitted to access a second set of one or more memory instances, with the second set being different than the first set.

15 Claims, 5 Drawing Sheets

| MEMORY | CONFIGURED CAPACITY | WORD ADDRESSING RANGE [19:0] | | ADDRESS DECODER VALUE [6:0] | ADDRESS MASK BITS [6:0] | RELEVANT BITS |
|---|---|---|---|---|---|---|
| MEM1 | 1MB | 00000h | 3FFFFh | 7'b00x_xxxx | 7'b001_1111 | [19:18] |
| MEM2 | 1MB | 40000h | 7FFFFh | 7'b01x_xxxx | 7'b001_1111 | [19:18] |
| MEM3 | 512KB | 80000h | 9FFFFh | 7'b100_xxxx | 7'b000_1111 | [19:17] |
| MEM4 | 512KB | A0000h | BFFFFh | 7'b101_xxxx | 7'b000_1111 | [19:17] |
| MEM5 | 256KB | C0000h | CFFFFh | 7'b110_0xxx | 7'b000_0111 | [19:16] |
| MEM6 | 128KB | D0000h | D7FFFh | 7'b110_10xx | 7'b000_0011 | [19:15] |
| MEM7 | 128KB | D8000h | DFFFFh | 7'b110_11xx | 7'b000_0011 | [19:15] |
| MEM8 | 64KB | E0000h | E3FFFh | 7'b111_000x | 7'b000_0001 | [19:14] |
| MEM9 | 32KB | E4000h | E5FFFh | 7'b111_0010 | 7'b000_0000 | [19:13] |

FIG. 4B

| MEMORY SIZE | MASK BITS [6:0] |
|---|---|
| 1MB | 7'b001_1111 |
| 512KB | 7'b000_1111 |
| 256KB | 7'b000_0111 |
| 128KB | 7'b000_0011 |
| 64KB | 7'b000_0001 |
| 32KB | 7'b000_0000 |

FIG. 4C

| No. OF BITS | DESCRIPTION |
|---|---|
| [6:0] | ADDRESS DECODER VALUE FOR A PARTICULAR INTERNAL MEMORY INSTANCE. |
| [6:0] | ADDRESS MASK VALUE AS MENTIONED IN THE ABOVE TABLE, DEPENDING ON THE MEMORY INSTANCE SIZE. |
| [4:0] | MASTER CLIENT FOR THE MEMORY INSTANCE.<br>"00001" FOR CL1..........<br>"10100" FOR CL20. |

FIG. 5

INTERNAL MEMORY CONTROLLER PROVIDING CONFIGURABLE ACCESS OF PROCESSOR CLIENTS TO MEMORY INSTANCES

FIELD OF THE INVENTION

The present invention relates generally to network processors or other types of processors, and more particularly to internal memory controllers in such processors.

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

A conventional network processor may include, among other elements, an internal memory and an associated internal memory controller. Such a network processor also includes a number of clients, where the term "client" as used in conjunction with a given network processor or other processor generally denotes a particular logic block, or other processing element of the processor, that requires access to the internal memory. Particular portions of the internal memory are commonly referred to as "memory instances." The internal memory controller controls access of the processor clients to the memory instances of the internal memory. One or more of the clients may access external memory instances, in place of or in addition to the internal memory instances accessed by those clients.

A problem that can arise in conventional network processors is that such processors are typically implemented such that the internal memory controller does not permit different clients to access different ones of the memory instances in a configurable manner. More specifically, the network processor generally cannot be configured such that any client can be connected to any of the memory instances. Instead, such conventional network processors may simply allow multiple clients to share a given memory instance, or may simply connect a client to a dedicated memory instance. This fails to provide an adequate degree of configuration flexibility, and thus unduly limits the internal memory bandwidth and throughput performance that are achievable in the network processor. It may also increase the amount of internal memory that is required in order to provide support for given set of client applications, which in turn increases the size, cost and power consumption of the processor.

Accordingly, a need exists for an improved memory controller, for use in a network processor or other type of processor, which provides improved configuration flexibility in connecting processor clients to internal memory instances.

SUMMARY OF THE INVENTION

The invention provides an internal memory controller having enhanced configurability relative to the conventional arrangements described above.

In accordance with one aspect of the invention, a network processor or other type of processor includes an internal memory controller that controls access of processor clients to memory instances of the internal memory. The processor may be configured, for example, as a network processor integrated circuit to provide an interface between a network and a switch fabric in a router or switch.

The internal memory controller includes a configurable switching element that is connectable between the clients and the memory instances, and is operative to control access of particular ones of the clients to particular ones of the memory instances. Generally, the configurable switching element is configurable to connect any one of at least a subset of the clients to each of at least a subset of the memory instances. In a first selectable configuration of the configurable switching element, a given one of the processor clients is permitted to access a first set of one or more memory instances, and in a second selectable configuration of the configurable switching element, the given processor client is permitted to access a second set of one or more memory instances, with the second set being different than the first set.

In an illustrative embodiment, the configurable switching element comprises a configurable crossbar having a first set of ports coupled to the processor clients and a second set of ports coupled to the memory instances. The configurable crossbar in this embodiment is configurable to connect any one of the processor clients to any set of one or more memory instances. Preferably, for a given configuration of the configurable crossbar, each memory instance has one and only one of the processor clients assigned to it, such that each client has a high-bandwidth interface with its assigned memory instance(s).

Advantageously, the techniques of the invention in the illustrative embodiment allow each of a number of processor clients to be connected to any of a number of memory instances, in a fully configurable manner. This significantly improves internal memory bandwidth and throughput performance of the processor. Moreover, a single network processor or other type of processor configured in accordance with the invention can be adapted for use in a variety of processing applications having different memory access requirements. Also, support for multiple assignments of memory instances to clients may be provided using a minimum amount of internal memory, thereby reducing processor size, cost and power consumption.

DETAILED DESCRIPTION OF THE INVENTION

The invention will be illustrated herein in conjunction with an exemplary information processing system which includes a network processor configured in a particular manner. It should be understood, however, that the invention is more generally applicable to any processor in which it is desirable to provide enhanced configurability of processor client access to internal memory instances than is possible using the conventional techniques described above.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

The term "internal memory controller" as used herein is intended to include any type of logic or processing circuitry which is capable of controlling access to at least a portion of an internal memory of a processor.

The terms "protocol data unit" and "PDU" as used herein are intended to include a cell, a packet, or other identifiable grouping of information.

The present invention in an illustrative embodiment comprises a network processor having an internal memory controller that is configurable to permit connection of any of a number of processor clients to any of a number of internal memory instances.

Figure 1:
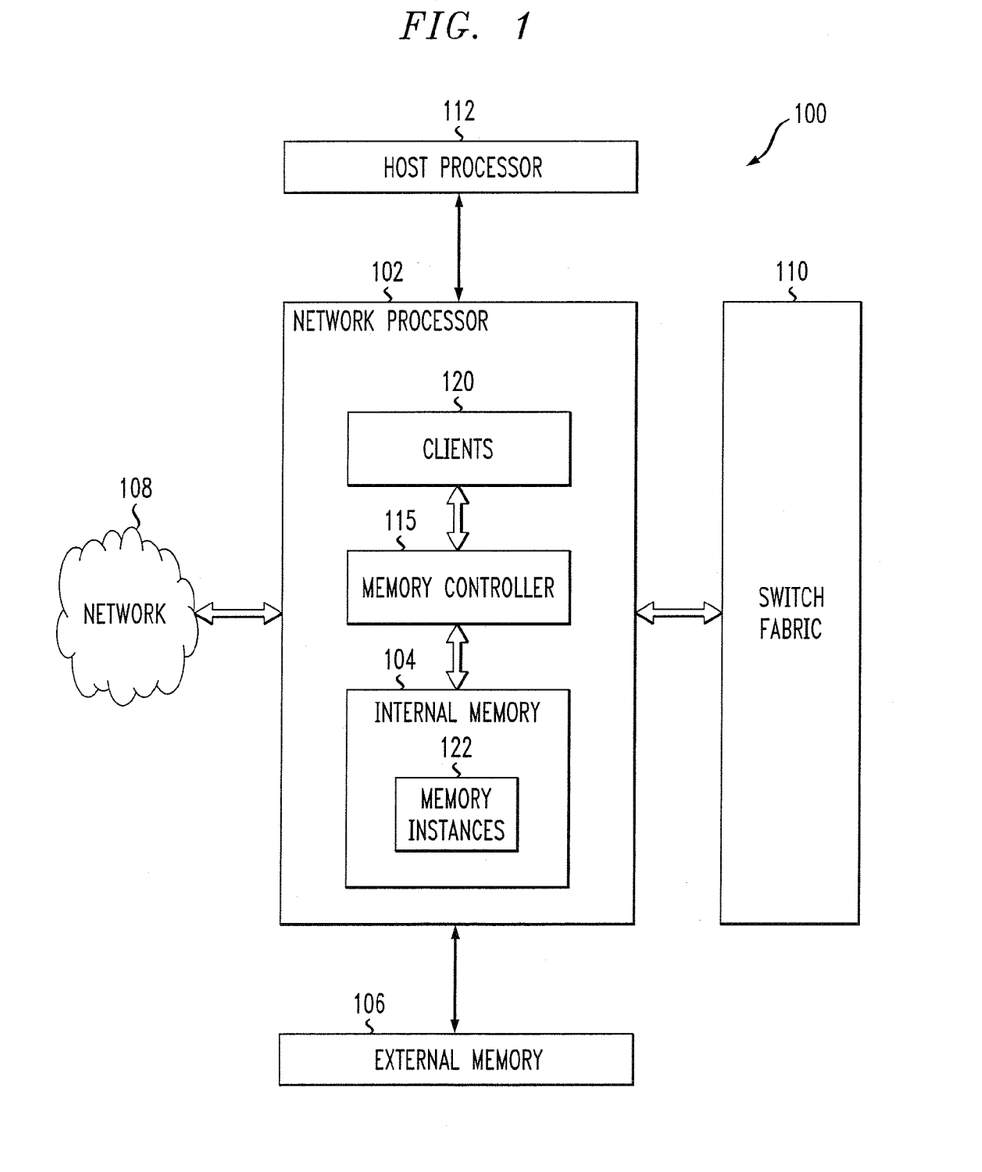
FIG. 1 is a simplified block diagram of an information processing system in which the present invention is implemented.

FIG. 1 shows an information processing system 100 in which the invention is implemented. The system 100 includes a network processor 102 having an internal memory 104. The network processor 102 is coupled to an external memory 106 as shown, and is configured to provide an interface between a network 108 over which PDUs are carried and a switch fabric 110 which controls switching of PDU data. The processor 102 and its associated external memory 106 may be implemented, e.g., as one or more integrated circuits installed on a line card or port card of a router or switch. In such a configuration, the switch fabric 110 is generally considered to be a part of the router or switch.

One or both of the internal and external memories 104, 106 may be utilized to implement otherwise conventional network processor memory elements such as PDU buffer memory, queuing and dispatch buffer memory, etc.

Also coupled to the network processor 102 is an associated host processor 112. The host processor 112 may be configured to communicate with the network processor 102 over a standard bus architecture, e.g., a peripheral component interconnect (PCI) bus.

In accordance with an aspect of the invention, the network processor 102 includes an internal memory controller 115. The memory controller 115 is operative to control access of a plurality of processor clients 120 to a plurality of memory instances 122 of the internal memory 104 of the network processor 102. As indicated above, a client generally comprises a particular logic block, or other processing element of the processor, that requires access to the internal memory, while a memory instance comprises a portion of the internal memory.

The memory instances generally represent portions of the internal memory that are assignable to processor clients in the manner described herein. The memory instances can be of any desired size or configuration.

Although the present invention relates to the manner in which clients access internal memory instances, one or more of the clients may access only external memory instances, or a combination of internal and external memory instances.

As will be described in greater detail below in conjunction with FIGS. 2 and 3, the internal memory controller comprises a configurable switching element that is connectable between the clients 120 and the memory instances 122 and is operative to control access of particular ones of the plurality of clients to particular ones of the plurality of memory instances. For example, in the illustrative embodiment, the configurable switching element is configurable to connect any one of the processor clients 120 to any set of memory instances comprising one or more of the memory instances 122. Any desired number of alternative configurations may also be supported in a given embodiment.

Generally, the memory controller 115 is arranged such that in a first selectable configuration of the configurable switching element, a given one of the processor clients 120 is permitted to access a first set of memory instances comprising one or more of the memory instances 122, and in a second selectable configuration of the configurable switching element, the given processor client is permitted to access a second set of memory instances comprising one or more of the memory instances 122, with the first and second sets representing different sets of memory instances.

It is usually preferable that, in a given configuration of the configurable switching element, each of the memory instances has one and only one of the processor clients assigned to it. A given client, however, can be permitted to access more than one of the memory instances. Such an arrangement ensures that each client is provided with a high-bandwidth interface to its associated memory instances, in that a given client does not have to share any of its memory instances with any of the other clients. Moreover, a given client need not be aware that multiple internal memory instances are being combined to provide that client with the required amount of internal memory for a particular configuration. These and other preferred features described herein should not be viewed as requirements of the invention, and other embodiments can be configured without utilization of such features.

It should also be appreciated that the particular memory controller arrangements described herein are by way of illustrative example only, and that other types and arrangements of memory controller elements may be used in alternative embodiments of the invention.

Also, the particular arrangement of system elements shown in FIG. 1 is by way of illustrative example only. More particularly, as previously noted, the invention can be implemented in any type of processor, and is not limited to any particular PDU processing application. The system 100 and network processor 102 as illustrated in FIG. 1 are considerably simplified for clarity of discussion, and may include other elements in addition to or in place of those specifically shown, including one or more elements of a type commonly found in a conventional implementation of such a system and network processor. For example, the network processor may include a classifier, a traffic manager, a scheduler, queuing and dispatch logic, interface circuitry for interfacing the network processor with the network 108, the switch fabric 110, the host processor 112 and other external devices, as well as other conventional elements not explicitly shown in the figure. These and other conventional elements, being well understood by those skilled in the art, are not described in detail herein.

The functionality of the network processor 102 as described herein may be implemented at least in part in the form of software program code. For example, the internal memory controller 115 may be implemented at least in part utilizing elements that are programmable via instructions or other software that may be supplied to the network processor 102 via the host processor 112 or other suitable mechanism.

Figure 2:
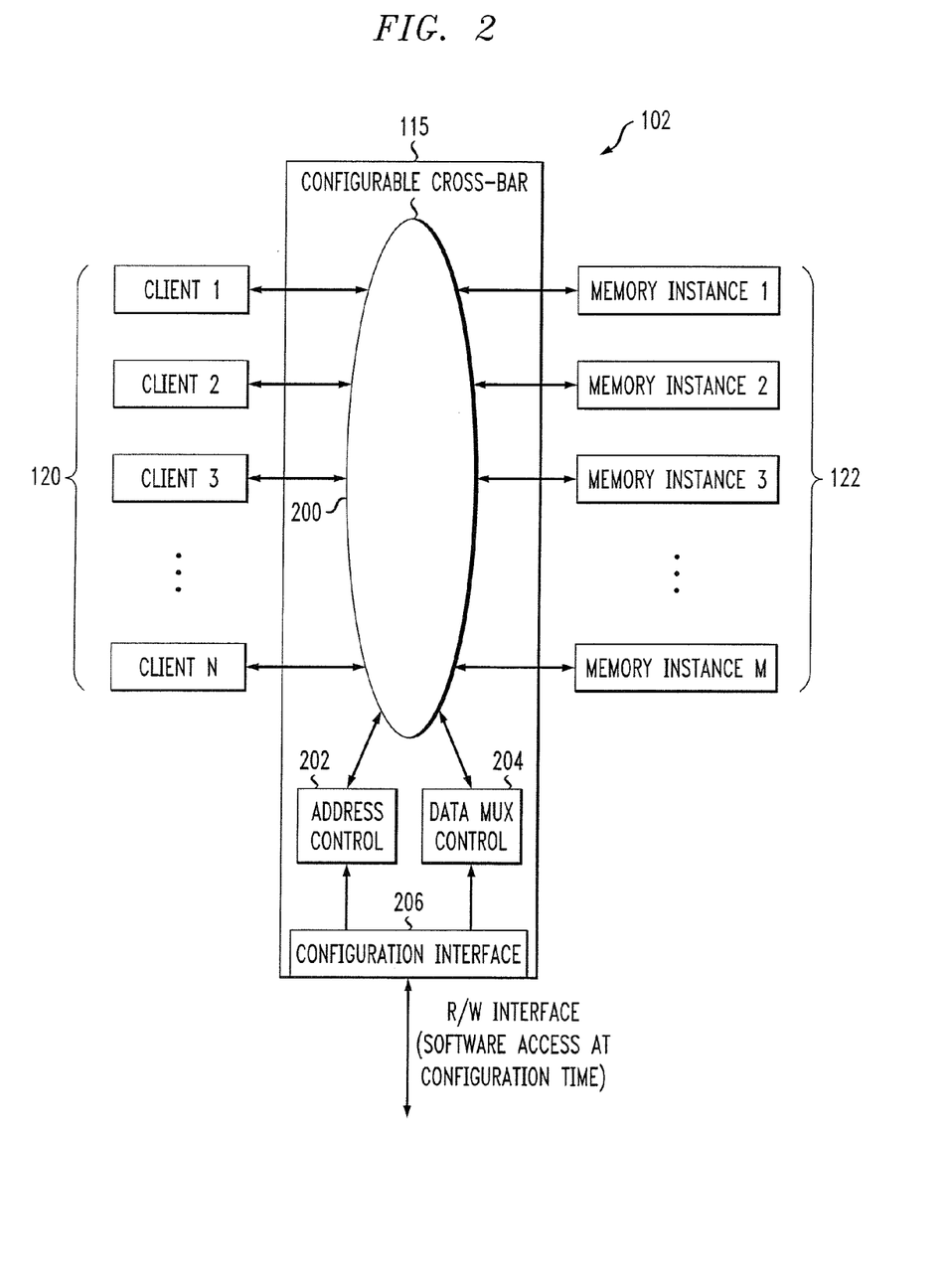
FIG. 2 shows a more detailed view of a network processor of the FIG. 1 system illustrating the implementation of an internal memory controller having a configurable crossbar in accordance with the invention.

FIG. 2 shows a more detailed view of a portion of the network processor 102 of the system 100, illustrating the operation of the internal memory controller 115. It should be noted that the internal memory controller 115 may perform other operations within the network processor, of a type conventionally performed by such an element but not otherwise associated with the memory configuration operations illustrated in FIG. 2, and that these other operations may be implemented in a manner known to those skilled in the art.

The internal memory controller 115 in this embodiment comprises a configurable switching element in the form of a configurable crossbar 200. The configurable crossbar has a first set of ports coupled to the processor clients 120 and a second set of ports coupled to the memory instances 122. As shown in the figure, there are a total of N processor clients, denoted Client 1, Client 2, . . . Client N, and a total of M memory instances, denoted Memory Instance 1, Memory Instance 2, . . . Memory Instance M. The particular values of N and M used in a given embodiment are purely arbitrary, and will generally depend on implementation-specific factors. Although N may be equal to M, each of N and M may take on any desired value independent of the value taken on by the other. By way of example, N may be less than M, as will be the case in the arrangements to be described below in conjunction with FIGS. 3A and 3B.

The configurable crossbar 200 may comprise an otherwise conventional crossbar switch of a type known in the art, modified in a straightforward manner for incorporation into the internal memory controller 115. Numerous other types of switches or other circuitry arrangements may be used in implementing a configurable switching element in accordance with the invention. For example, a configurable switching element may be implemented as an element which controllably enables particular ones of the memory instances responsive to a memory access request received from a given client. Such configurable switching elements may be implemented using hardware, software, firmware or other arrangements, in any combination.

The internal memory controller 115 further comprises control circuitry operative to control selection of a particular configuration for the configurable crossbar 200. This control circuitry in the illustrative embodiment comprises an address control circuit 202, and a data multiplexing (MUX) control circuit 204.

The internal memory controller 115 in the illustrative embodiment controls address translation and data path steering as required to provide particular ones of the processor clients 120 with access to particular ones of the memory instances 122 via the configurable crossbar 200. For example, for a given access request received in the memory controller from one of the clients 120, the memory controller may be operative to decode the request, to pass it to the appropriate memory instance and, in the case of a read operation, to return the read data from the memory instance back to the client. Address control circuit 202 and data MUX control circuit 204 are utilized in performing operations of this type, and numerous suitable implementations of such elements will be readily apparent to those skilled in the art.

Also included in the internal memory controller 115 is a configuration interface 206 providing an interface between the configurable crossbar 200 and a configuration source external to the memory controller. Such an external configuration source may provide to the memory controller information utilizable to control selection of a particular configuration for the configurable crossbar 200. For example, the host processor 112 may serve as an external configuration source, with software running on the host processor being utilized at configuration time to provide appropriate configuration information to the configurable crossbar 200. Other configuration sourcesS116, the may be used, including sources internal to the network processor 102.

The configuration interface 206 in the illustrative embodiment may be associated with an otherwise conventional read/write (R/W) interface of the memory controller 115, as indicated in the figure.

Figure 3A:
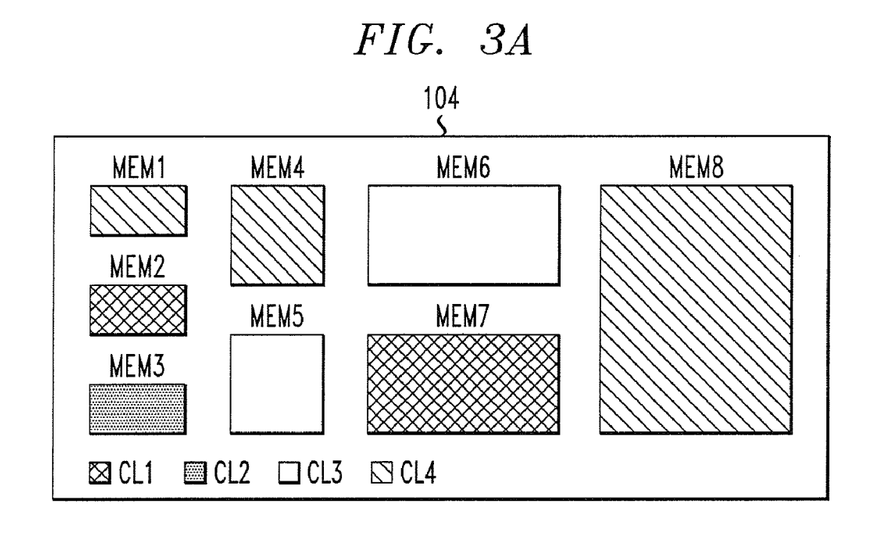
FIGS. 3A and 3B are diagrams illustrating the configurability of various memory instances of an internal memory in the network processor of the FIG. 1 system in accordance with the invention.
Figure 3B:
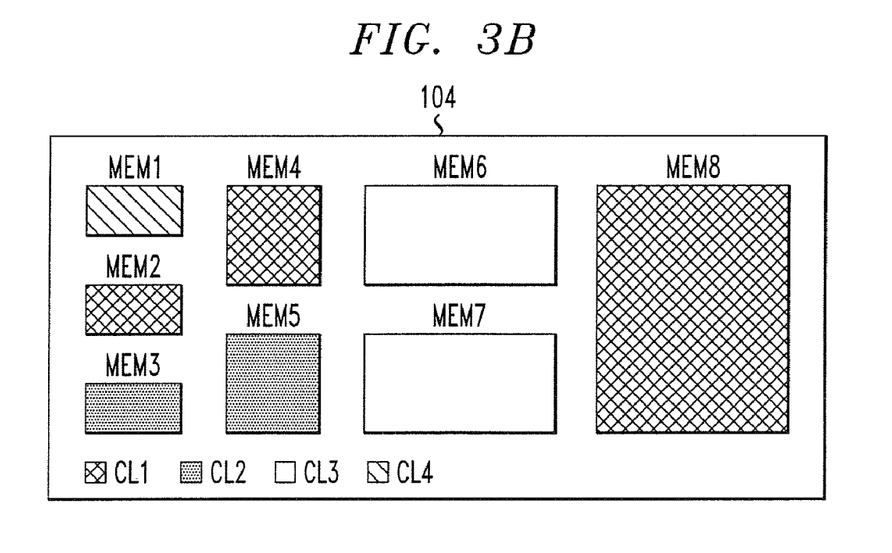

FIGS. 3A and 3B illustrate the configurability of various memory instances of the internal memory 104 of the network processor 102, utilizing the internal memory controller 115 as described above. In this example, there are N=4 processor clients, denoted CL1, CL2, CL3 and CL4, and M=8 memory instances, denoted mem1, mem2, . . . mem8, as shown in the figures. In each of FIGS. 3A and 3B, the shading of the eight memory instances in the internal memory 104 indicates which of the four clients are associated with which of the eight memory instances, in accordance with the key provided in the figure.

The internal memory instances may comprise, by way of example, portions of an internal memory comprising an embedded static random access memory (SRAM) of the network processor, although other types of memory and memory instances can of course be used.

As was mentioned previously, the different memory instances may have different sizes, and this is apparent from the figures. For example, such instances in a given embodiment may vary in size from about 32 kilobytes (KB) to 512 KB. Other memory sizes can be used, as appropriate for the particular needs of a given implementation of the invention.

FIG. 3A shows the assignment of the eight memory instances of internal memory 104 to the four processor clients in a first selectable configuration of the configurable crossbar 200 of the memory controller 115. In this configuration, client CL1 is assigned memory instances mem2 and mem7, client CL2 is assigned memory instance mem3, client CL3 is assigned memory instances mem5 and mem6, and client CL4 is assigned memory instances mem1, mem4 and mem8.

Referring now to FIG. 3B, the assignment of the eight memory instances of internal memory 104 to the four processor clients in a second selectable configuration of the configurable crossbar 200 is shown. In this configuration, client CL1 is assigned memory instances mem2, mem4 and mem8, client CL2 is assigned memory instances mem3 and mem5, client CL3 is assigned memory instances mem6 and mem7, and client CL4 is assigned memory instance mem1.

As is apparent from the examples of FIGS. 3A and 3B, the configurable crossbar 200 of the memory controller 115 may be used to connect each of the four processor clients to different ones of the eight memory instances in different selectable configurations.

This ability to select different configurations is particularly advantageous in that it allows the same network processor or other type of processor to be used in a variety of different applications in which processor clients may have different memory requirements.

In a given one of the configurations shown in the foregoing examples, each of the memory instances has one and only one of the processor clients associated with it, but one or more of the clients are each permitted to access more than one of the memory instances. As noted above, such an arrangement ensures that each client is provided with a high-bandwidth interface to its associated memory instances in the given configuration. Also, as mentioned previously, a given client need not be aware that multiple internal memory instances are being combined to provide that client with the required amount of internal memory for a particular configuration.

Numerous alternative arrangements are possible, and the particular arrangements shown in FIGS. 2 and 3 should be considered as illustrative examples only, rather than as limiting the scope of the invention in any way.

The operation of the address control circuit 202 of the internal memory controller 115 in the illustrative embodiment will now be described in greater detail with reference to FIGS. 4A, 4B and 4C. These figures show tables illustrating the operation of exemplary address decoding logic in the internal memory controller 115. This address decoding logic is configured to allow an address associated with a given access request to be decoded quickly, preferably in less time than a single high-speed clock cycle in the processor, so that latency for the access is low. As indicated above, the requesting client in the illustrative embodiment need not be aware of how many and which memory instances it is connected to, and therefore typically cannot assist in decoding the address in the illustrative embodiment. The address control circuit 202 therefore includes an address decoder comprising address decoding logic which accepts the address, decodes it and passes the request to the appropriate memory instance. The address decoding logic takes into consideration the different memory sizes of the internal memory instances assigned to a given client and decodes the address accordingly.

In this example, it will be assumed without limitation that a given client can address up to 4 megabytes (MB) of internal memory space, that the sizes of the internal memory instances can vary from 32 KB to 1 MB in multiples of two, that the addresses are 20 bits in length, and that the basic word size is 32 bits, that is, four bytes.

Figure 4A:
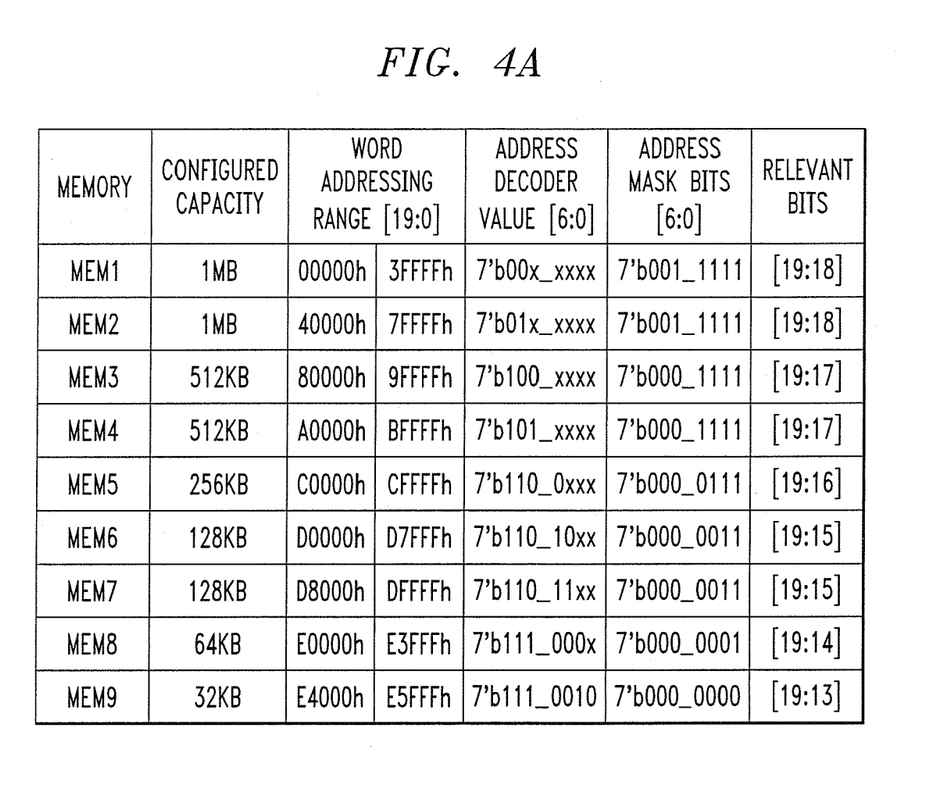
FIGS. 4A, 4B and 4C are tables illustrating the operation of exemplary address decoding logic in the internal memory controller of FIG. 2.

With reference to the table in FIG. 4A, the given client in this example may be assigned the nine memory instances denoted mem1, mem2, . . . . mem9. Mem1 and mem2 each have a size of 1 MB, mem3 and mem4 each have a size of 512 KB, mem5 has a size of 256 KB, mem6 and mem7 each have a size of 128 KB, mem8 has a size of 64 KB, and mem9 has a size of 32 KB. It should be noted that the memory instances in this example should not be viewed as corresponding to those described in the context of the configurations of FIGS. 3A and 3B.

The FIG. 4A table shows the word addressing range, address decoder value, address mask bits and relevant bits associated with each of the nine memory instances in this example.

In accordance with the invention, addresses are allocated to the memory instances in order of decreasing memory instance size. More specifically, the biggest memory instance is allocated first, that is, assigned addresses starting with 00000h in this example, where "h" denotes hexadecimal notation, while the smallest memory instance is allocated last. Also, a different set of mask bits is associated with each of the different memory instance sizes. This is shown in the table of FIG. 4B, which lists the memory sizes and the particular set of mask bits associated with each memory size. In this example, which utilizes a 20-bit address denoted as bits [19:0], the mask bits comprise a seven-bit value denoted as bits [6:0]. Thus, the mask bits associated with the 1 MB memory instance size are 0011111, the mask bits associated with the 512 KB memory instance size are 0001111, the mask bits associated with the 256 KB memory instance size are 0000111, and so on, as shown in the table.

The address decoder values may be determined in the following manner. Once the memory instances for the given client are organized in decreasing size as described above, with the biggest memory instance starting with the 0th address, the upper seven bits of the memory instance start address are used as the address decoder value for the biggest memory instance. So in the FIG. 4A example, mem1 has start address 00000h so the corresponding address decoder value is the seven-bit value 0000000b, where "b" denotes binary notation. For mem2 the start address is 40000h, so its corresponding address decoder value is the seven-bit value 0100000b. For mem9 the start address is E4000h, so its corresponding address decoder value is the seven-bit value 1110010b. These values as shown in the FIG. 4A table may include one or more "don't care" bits, determined based on the corresponding mask bits, as will be described in greater detail below.

The address decoding logic in this example applies the mask bits to the upper seven bits of an incoming address, and compares the result to an address decoder value stored in a configuration register to see if there is an address hit for a particular one of the memory instances. The particular number of upper address bits that are used is a function of the smallest memory instance size. For this example, where the smallest memory instance size is 32 KB, the upper seven bits are used, but different numbers of upper bits would typically be used in embodiments with different smallest memory instance sizes.

In the event of an address hit, the incoming address can be passed as is to the appropriate memory instance. It is also possible to pass the address to all instances, while enabling only the appropriate memory instance.

As noted above, the table in FIG. 4A indicates that a different address decoder value is associated with each of the nine memory instances mem1 through mem9. The address decoder value as shown in the FIG. 4A table is a seven-bit value denoted as bits [6:0]. The value "x" in a given bit position in the address decoder value in this table denotes a "don't care" value for simplicity of illustration, but in practice would represent a '0' value in the context of this example. It can be seen that the number of relevant bits, after application of the mask bits, are the same for each memory instance size. That is, the first two bits, denoted bits [19:18], are not masked and thus relevant for the 1 MB memory instance size, the first three bit, denoted bits [19:17], are not masked and thus relevant for the 512 KB memory instance size, and so on.

The mask bits may thus be viewed as indicative of the memory instance size. Therefore, if a given instance has a certain size in one implementation of a network processor, and a different size in another implementation of the network processor, this situation can be easily accommodated through update of the mask bits. The address decoding logic is therefore independent of the memory instance size. Also, since the address can be passed as is to the appropriate memory instance, the address decoding process is simplified and can be performed considerably faster than would otherwise be possible.

Figure 4B:
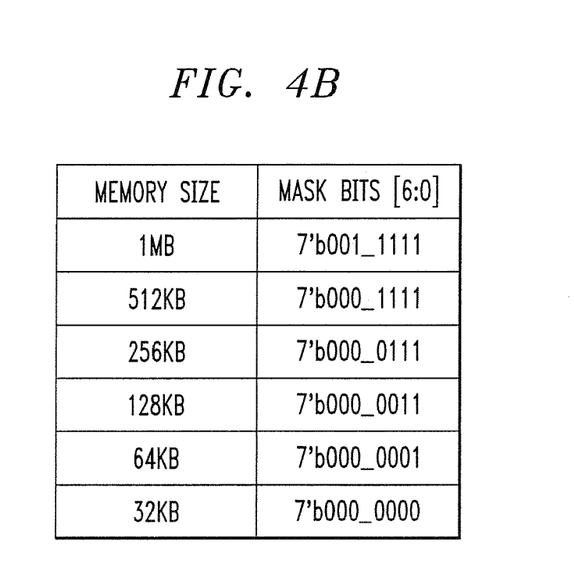
Figure 4C:
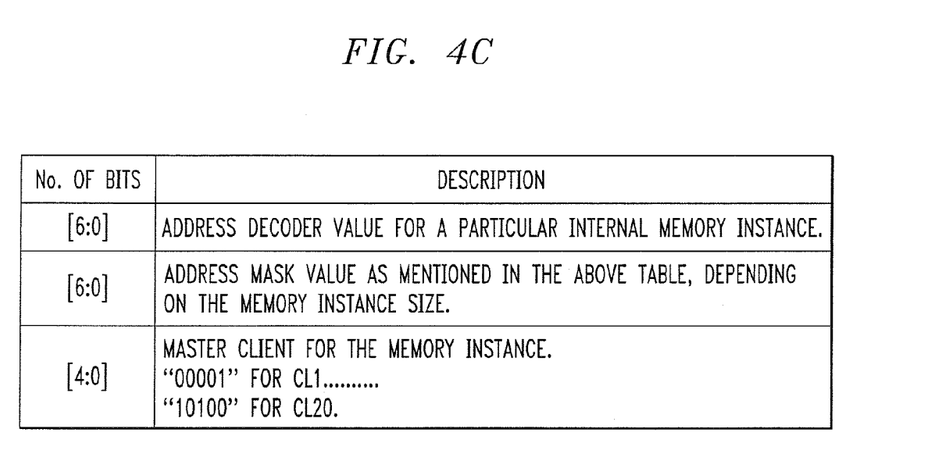

The table in FIG. 4C illustrates a set of configuration registers that may be used in implementing the above-described address decoding logic. The set shown may be viewed as including three registers, and corresponds to a single memory instance, although each of the memory instances will have a similar set of such registers in the illustrative embodiment. It should also be noted that the different entries shown in the FIG. 4C table may be stored as different portions of a single register. The register or set of registers may be within the configuration interface 206, or elsewhere in the network processor 102.

The set of registers as shown stores three values for its corresponding memory instance, namely the seven-bit address decoder value for that memory instance, the seven-bit address mask value as determined from the FIG. 4B table based on the size of that memory instance, and a five-bit value, denoted as bits [4:0], which identifies a "master" client for that memory instance. In this example, it is assumed that there are no more than 20 distinct clients, denoted CL1 through CL20, with each client having a particular five-bit identifier, namely 00001 for CL1, . . . , 10100 for CL20. The master client identifier specifies which of the clients, if any, has been assigned to the particular memory instance. This allows the address decoder logic to determine the appropriate client whose access request address is validly decoded for the particular memory instance, so that any other such access requests from other clients that are directed to the particular memory instance can be ignored. Thus, a decoded address is considered valid for a given client only if the master client identifier stored for the particular memory instance specifies the given client. A value of 00000 in this implementation indicates that there is no master client for the particular memory instance. As noted above, an address decoder value, address mask value and master client identifier are stored for each of the memory instances.

An advantage of the exemplary address decoding logic as described in conjunction with FIGS. 4A, 4B and 4C is that the same decoding logic can be used with any number of different configurations of varying memory sizes, by simply adjusting the address decoder values, address mask values and client identifiers stored for the particular memory instances. Also, as indicated above, it is significantly faster than conventional approaches, such as those which utilize starting and ending offsets and corresponding hardware comparators.

It is to be appreciated, however, that an internal memory controller in accordance with the invention does not require the particular address decoding logic of FIGS. 4A, 4B and 4C, and other arrangements, including conventional address decoding logic arrangements of the type noted above, may be used.

The present invention provides a number of significant advantages relative to conventional techniques. For example, the illustrative embodiment allows each of a number of processor clients to be connected to any of a number of memory instances, in a fully configurable manner. This significantly improves internal memory bandwidth and throughput performance of the network processor. Also, support for multiple assignments of memory instances to clients may be provided using a minimum amount of internal memory, thereby reducing processor size, cost and power consumption.

The network processor 102 may be configured as an integrated circuit to provide an interface between a network and a switch fabric in a router or switch.

Figure 5:
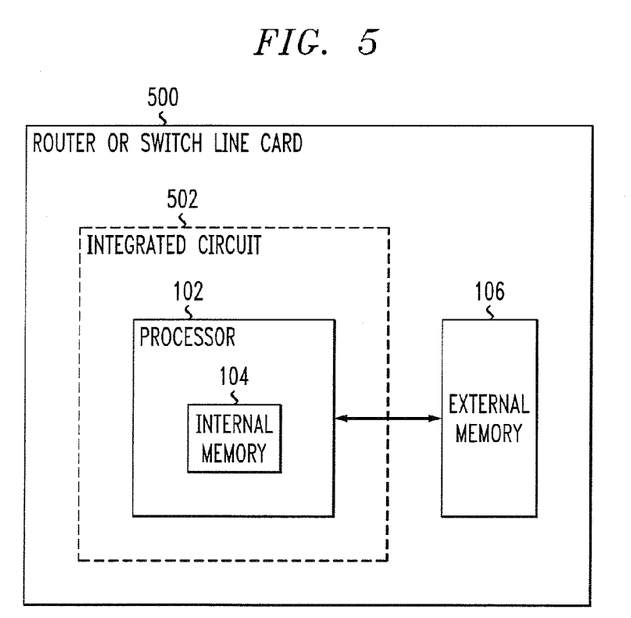
FIG. 5 illustrates one possible implementation of a network processor of the FIG. 1 system as an integrated circuit installed on a line card of a router or switch.

FIG. 5 illustrates an example router or switch line card embodiment of a portion of the system 100 of FIG. 1. In this embodiment, the processing system comprises a line card 500 having at least one integrated circuit 502 installed thereon. The integrated circuit 502 comprises network processor 102 which has internal memory 104. The network processor 102 interacts with external memory 106 on the line card 500. The host processor 112 may also be installed on the line card 500, although it is not shown in the figure.

The portion of the processing system as shown in FIG. 5 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

The above-described embodiments of the invention are intended to be illustrative only. For example, although the illustrative embodiment of FIG. 2 utilizes a configurable crossbar for providing flexible interconnection of processor clients to memory instances, other arrangements of at least one of hardware, software and firmware may be used to implement the described functionality. In addition, the particular number, type and arrangement of processor clients and memory instances may vary depending upon the particular needs of a given application. Also, different types of address decoding logic may be used. These and numerous other alternative embodiments within the scope of the following claims will be readily apparent to those skilled in the art.

What is claimed is:

1. A network processor integrated circuit comprising:
   a plurality of processor clients internal to the network processor integrated circuit;
   an internal memory having a plurality of memory instances; and
   an internal memory controller for controlling access of the plurality of processor clients to the plurality of memory instances, the internal memory controller comprising a configurable switching element;
   the configurable switching element being connectable between the plurality of processor clients and the plurality of memory instances and being operative to control access of particular ones of the plurality of processor clients to particular ones of the plurality of memory instances;
   wherein the configurable switching element is configurable to connect any one of at least a subset of the plurality of processor clients to each of at least a subset of the plurality of memory instances,
   such that in a first selectable configuration of the configurable switching element, a given one of the processor clients is permitted to access a first set of memory instances comprising one or more of the plurality of memory instances, and in a second selectable configuration of the configurable switching element, the given processor client is permitted to access a second set of memory instances comprising one or more of the plurality of memory instances, the second set being different than the first set;
   wherein a different set of mask bits is associated with each of a plurality of different memory instance sizes, and a different address decoder value is associated with each of the plurality of memory instances;
   wherein address decoding logic applies the mask bits for a client memory instance to an incoming address from the given processor client, and compares the result to the address decoder value for the given memory instance to determine if the incoming address is directed to an address in the given memory instance.

2. The network processor integrated circuit of claim 1 wherein the configurable switching element comprises a configurable crossbar having a first set of ports coupled to the plurality of processor clients and a second set of ports coupled to the plurality of memory instances.

3. The network processor integrated circuit of claim 1 wherein the memory controller further comprises control circuitry operative to control selection of a particular configuration for the configurable switching element.

4. The network processor integrated circuit of claim 3 wherein the control circuitry further comprises an address control circuit.

5. The network processor integrated circuit of claim 3 wherein the control circuitry further comprises a data multiplexing control circuit.

6. The network processor integrated circuit of claim 1 wherein the internal memory controller further comprises a configuration interface providing an interface between the configurable switching element and a configuration source external to the memory controller, the external configuration source providing to the memory controller information utilizable to control selection of a particular configuration for the configurable switching element.

7. The network processor integrated circuit of claim 1 wherein the plurality of processor clients comprises N processor clients, and the plurality of memory instances comprises M memory instances, where N need not be equal to M.

8. The network processor integrated circuit of claim 7 wherein N is less than M.

9. The network processor integrated circuit of claim 1 wherein the configurable switching element is configurable to connect any one of the plurality of processor clients to any set of memory instances comprising one or more of the plurality of memory instances.

10. The network processor integrated circuit of claim 1 wherein for a given configuration of the configurable switching element, each of at least a subset of the memory instances has one and only one of the processor clients assigned to it.

11. The network processor integrated circuit of claim 1 wherein addresses are allocated to multiple memory instances associated with the given processor client in order of decreasing memory instance size.

12. The network processor integrated circuit of claim 1 wherein multiple memory instances associated with the given processor client have different sizes which are related to one another as multiples of two.

13. The network processor integrated circuit of claim 1 wherein a decoded address is considered valid for the given processor client only if a master client identifier stored for the given memory instance specifies the given processor client.

14. The network processor integrated circuit of claim 1 wherein the network processor integrated circuit is configured to provide an interface for communication of protocol data units between a network and a switch fabric.

15. A method for use in a network processor integrated circuit for controlling access of a plurality of processor clients internal to the network processor integrated circuit to a plurality of memory instances of an internal memory of the network processor integrated circuit, the method comprising the steps of:

provided within the network processor integrated circuit an internal memory controller comprising a configurable switching element;

the configurable switching element being connectable between the plurality of processor clients and the plurality of memory instances and being operative to control access of particular ones of the plurality of processor clients to particular ones of the plurality of memory instances;

wherein the configurable switching element is configurable to connect any one of at least a subset of the plurality of processor clients to each of at least a subset of the plurality of memory instances; and selecting one of at least a first selectable configuration and a second selectable configuration of the configurable switching element, wherein in the first selectable configuration a given one of the processor clients is permitted to access a first set of memory instances comprising one or more of the plurality of memory instances, and in the second selectable configuration the given processor client is permitted to access a second set of memory instances comprising one or more of the plurality of memory instances, the second set being different than the first set;

wherein a different set of mask bits is associated with each of a plurality of different memory instance sizes, and a different address decoder value is associated with each of the plurality of memory instances;

wherein address decoding logic applies the mask bits for a given memory instance to an incoming address from the given processor client, and compares the result to the address decoder value for the given memory instance to determine if the incoming address is directed to an address in the given memory instance.

\* \* \* \* \*

UNITED STATES PATENT AND TRADEMARK OFFICE
CERTIFICATE OF CORRECTION

| | | |
|---|---|---|
| PATENT NO. | : 7,574,482 B2 | |
| APPLICATION NO. | : 10/699092 | |
| DATED | : August 11, 2009 | |
| INVENTOR(S) | : D. A. Brown et al. | |

It is certified that error appears in the above-identified patent and that said Letters Patent is hereby corrected as shown below:

In Claim 1 at Column 10, line 45: Please replace the word "client" with the word --given--

Signed and Sealed this

Twenty-ninth Day of September, 2009

David J. Kappos
*Director of the United States Patent and Trademark Office*